(12) United States Patent
Lu et al.

(10) Patent No.: US 9,121,547 B2
(45) Date of Patent: Sep. 1, 2015

(54) LINKAGE SUPPORTING DEVICE

(71) Applicant: SYNCMOLD ENTERPRISE CORP., New Taipei (TW)

(72) Inventors: Der-Wei Lu, New Taipei (TW); Chung-Cheng Hu, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 0 days.

(21) Appl. No.: 14/283,443

(22) Filed: May 21, 2014

(65) Prior Publication Data

US 2015/0176755 A1 Jun. 25, 2015

(30) Foreign Application Priority Data

Dec. 20, 2013 (TW) .............................. 102224085 U

(51) Int. Cl.
E04G 3/00 (2006.01)
F16M 11/20 (2006.01)
F16M 11/10 (2006.01)
F16M 11/24 (2006.01)

(52) U.S. Cl.
CPC ........... F16M 11/2021 (2013.01); F16M 11/10 (2013.01); F16M 11/2092 (2013.01); F16M 11/24 (2013.01); F16M 2200/044 (2013.01); F16M 2200/063 (2013.01)

(58) Field of Classification Search
CPC .............. F16M 11/2021; F16M 11/10; F16M 11/2092; F16M 11/24; F16M 2200/044; F16M 2200/063
USPC .............. 248/284.1, 917, 918, 919, 921, 922, 248/923; 361/679.06, 679.07
See application file for complete search history.

(56) References Cited

U.S. PATENT DOCUMENTS

| 7,448,583 | B2* | 11/2008 | Kim et al. ................... 248/278.1 |
| 8,035,957 | B2* | 10/2011 | Jung ......................... 361/679.07 |
| 8,196,875 | B2* | 6/2012 | Lien et al. ...................... 248/121 |
| 8,763,969 | B2* | 7/2014 | Wu et al. ..................... 248/284.1 |
| 2004/0021051 | A1* | 2/2004 | Chiu .............................. 248/371 |
| 2004/0203282 | A1* | 10/2004 | Lim et al. ...................... 439/577 |
| 2008/0277539 | A1* | 11/2008 | Lee et al. ...................... 248/157 |
| 2009/0008515 | A1* | 1/2009 | Davis et al. .................. 248/68.1 |
| 2009/0072112 | A1* | 3/2009 | Lee et al. ...................... 248/371 |
| 2009/0134286 | A1* | 5/2009 | Lee et al. .................... 248/125.1 |

* cited by examiner

Primary Examiner — Gwendolyn W Baxter
(74) Attorney, Agent, or Firm — Steptoe & Johnson LLP

(57) ABSTRACT

A linkage supporting device is used for supporting a display on a working surface, including: a base that can be placed on the working surface, and first and second shafts fixed to the base without coinciding with one another; a first bar member having a main bar with two ends pivotally disposed on the first and third shafts, respectively; a second bar member having two ends pivotally disposed on the third and fourth shafts, respectively; a third bar member having two ends pivotally disposed on the fourth and fifth shafts, respectively; a fourth bar member that has a sliding bar slidably received in a receiving space of the main bar and having two ends pivotally disposed on the fifth and sixth shafts, respectively; a fifth bar member having two ends pivotally disposed on the sixth and second shafts, respectively; and a spring member received in the receiving space and having two ends connected to the first and fourth bar members, respectively.

9 Claims, 9 Drawing Sheets

LINKAGE SUPPORTING DEVICE

BACKGROUND OF THE INVENTION

1. Field of the Invention

The present invention relates to display supporting structures, and, more particularly, to a linkage supporting device used for supporting a display.

2. Description of Related Art

FIG. 1A is a schematic view of a conventional four-bar linkage structure. Referring to FIG. 1A, the four-bar linkage structure mainly has a first connecting frame 101, a second connecting frame 102, a mounting base 103, and a rotating shaft 104. The first connecting frame 101 and the second connecting frame 102 are pivotally connected between a rotating frame 105 and the mounting base 103. One ends of the first connecting frame 101 and the second connecting frame 102 are pivotally connected to the rotating frame 105 through the rotating shaft 104, and the other ends of the first connecting frame 101 and the second connecting frame 102 are pivotally connected to the mounting base 103 through another rotating shaft (not labeled). As such, the first connecting frame 101 and the second connecting frame 102 are arranged in parallel. In operation, a display disposed on the rotating frame 105 is moved to thus rotate the rotating frame 105 relative to the first connecting frame 101 and the second connecting frame 102 around the rotating shaft 104, thereby changing the angle of the display. Therefore, when the four-bar linkage structure is at a first limit position, a position limiting projection 1011 of the first connecting frame 101 abuts against a position limiting pin 1031 of the mounting base 103, and a position limiting notch 1021 abuts against a position limiting portion 1041 of the rotating shaft 104, thus limiting the display at a lowest position. FIG. 1B shows a second limit position of the four-bar linkage structure. Referring to FIG. 1B, a position limiting projection 1012 of the first connecting frame 101 abuts against the position limiting portion 1041 of the rotating shaft 104, and a position limiting notch 1021 of the second connecting frame 102 abuts against the position limiting pin 1031 of the mounting base 103, thus limiting the display at a highest position. Further, an extension spring (not labeled) is provided. The contraction force of the extension spring can be increased or decreased with different moving directions of the first connecting frame 101 and the second connecting frame 102 so as to offer enough supporting strength.

In the four-bar linkage structure, the first connecting frame 101 and the second connecting frame 102 are stacked so as to cooperatively operate to achieve position adjusting and limiting functions. However, such a four-bar linkage structure has a large size and cannot meet the demand for a shorter, thinner, lighter and smaller structure.

Therefore, there is a need to provide a linkage supporting device so as to overcome the above-described drawbacks.

SUMMARY OF THE INVENTION

In order to achieve the above and other objects, the present invention provides a linkage supporting device for supporting a display on a working surface, which comprises: a base that can be placed on the working surface; a first shaft fixed to the base; a second shaft fixed to the base without coinciding with the first shaft; a first bar member having a main bar, wherein the main bar has a first end pivotally disposed on the first shaft, a second end opposite to the first end, and a receiving space; a third shaft for the second end of the main bar to be pivotally disposed thereon; a second bar member having one end pivotally disposed on the third shaft; a fourth shaft for the other end of the second bar member to be pivotally disposed thereon; a third bar member having one end pivotally disposed on the fourth shaft; a fifth shaft for the other end of the third bar member to be pivotally disposed thereon; a fourth bar member having a sliding bar, wherein the sliding bar is slidably received in the receiving space of the main bar, and has a head end pivotally disposed on the fifth shaft and a tail end opposite to the head end; a sixth shaft for the tail end of the sliding bar to be pivotally disposed thereon; a fifth bar member having two ends pivotally disposed on the sixth shaft and the second shaft, respectively; and a spring member received in the receiving space of the main bar and having two ends connected to the first bar member and the fourth bar member, respectively, wherein when the display is moved from a higher position to a lower position, the fourth shaft rotates around the third shaft and the second bar member pivotally rotates to drive the third bar member to move so as to cause the sliding bar to slide in the receiving space, thereby increasing the resistance force of the spring member.

In an embodiment, the first shaft, the third shaft, the fifth shaft and the sixth shaft are on a same plane, and the second shaft and the fourth shaft are not on the plane.

In an embodiment, the spring member is a compression spring. When the display is moved from the higher position to the lower position, the fourth shaft rotates around the third shaft to shorten the distance between the fourth shaft and the second shaft and cause the third bar member to move so as to cause the sliding bar to slide toward the first end of the main bar, thereby compressing the spring member.

In an embodiment, the spring member is an extension spring. When the display is moved from the higher position to the lower position, the fourth shaft rotates around the third shaft to increase the distance between the fourth shaft and the second shaft and cause the third bar member to move so as to cause the sliding bar to slide toward the second end of the main bar, thereby stretching the spring member.

In an embodiment, the base has a base body that can be placed on the working surface, and an inner plate and an outer plate perpendicularly extending from the base body, the first shaft being fixed on the outer plate and the second shaft being fixed on the inner plate.

In an embodiment, the first bar member further has a torque adjusting unit that adjusts the position of a sliding block in the receiving space, one end of the spring member abutting against the sliding block.

In an embodiment, the first bar member further has a guiding bar disposed on the main bar, and the fourth bar member further has a wing plate covering the guiding bar, the other end of the spring member abutting against the wing plate. Further, the spring member can be disposed around the guiding bar.

In an embodiment, the first bar member further has a cover locked to the main bar through a screw group passing through a through groove of the sliding bar.

The device can further comprise a display holder pivotally disposed on the third shaft for holding the display.

Therefore, the present invention substantially forms a six-bar linkage supporting device with one bar member slidably received in a receiving space of another bar member. As such, when the position of the display is changed, sliding of the bar member in the receiving space causes a cooperative operation of the bar members of the linkage supporting device so as to support the display at different positions. Compared with the conventional four-bar linkage supporting structure having a parallelogram configuration, the linkage supporting device of

DETAILED DESCRIPTION OF PREFERRED EMBODIMENTS

The following illustrative embodiments are provided to illustrate the disclosure of the present invention, these and other advantages and effects can be apparent to those in the art after reading this specification.

It should be noted that all the drawings are not intended to limit the present invention. Various modifications and variations can be made without departing from the spirit of the present invention.

Figure 1A:
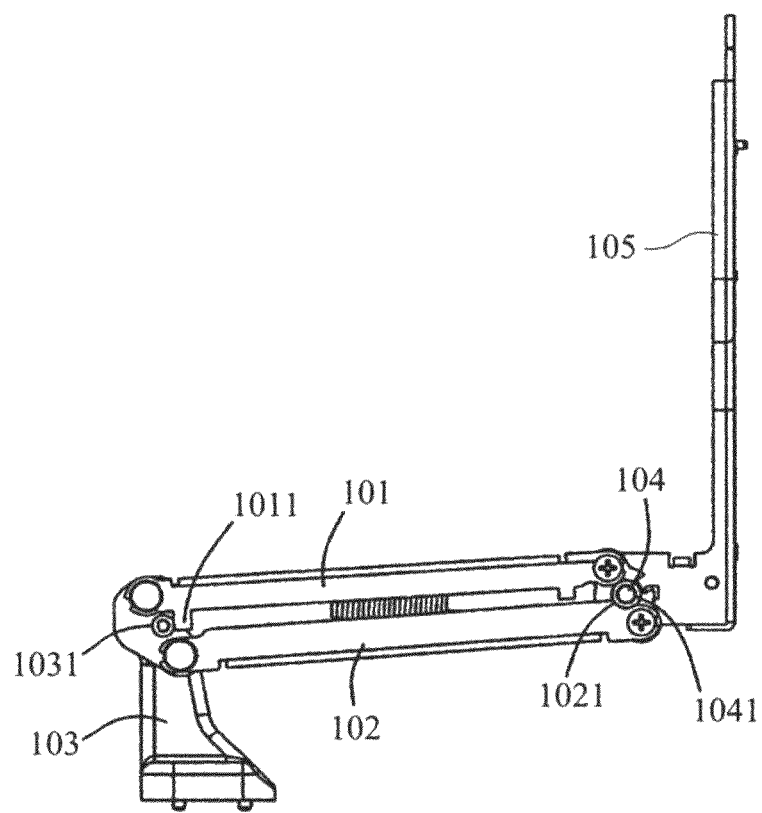
FIGS. 1A and 1B are schematic views of a conventional four-bar linkage structure.
Figure 1B:
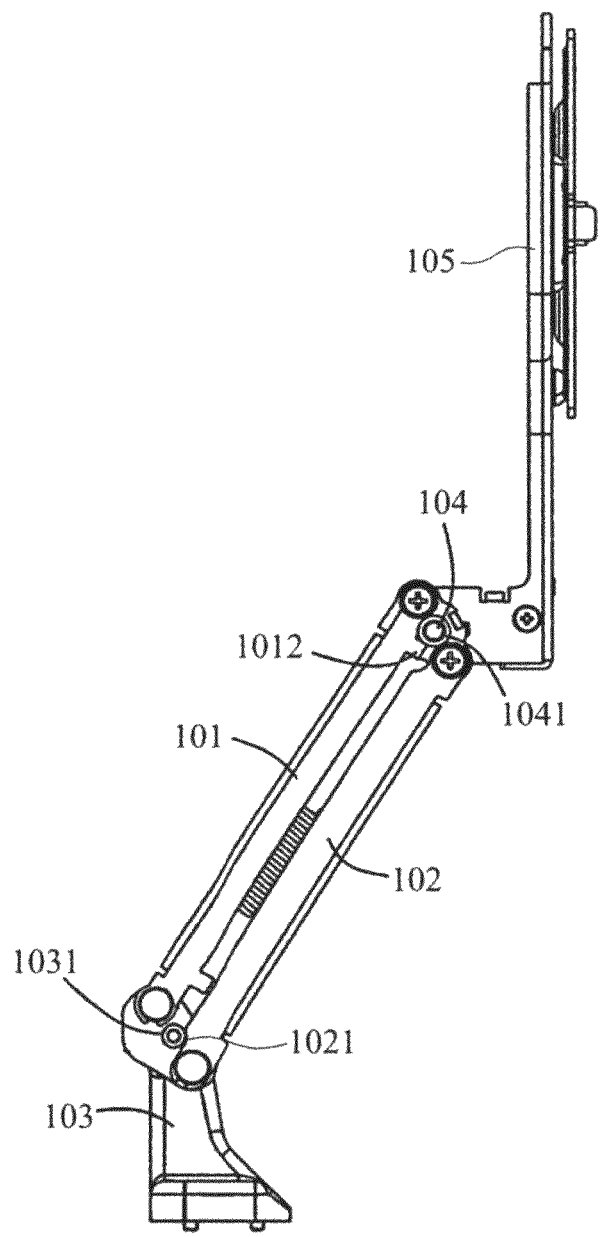
Figure 2:
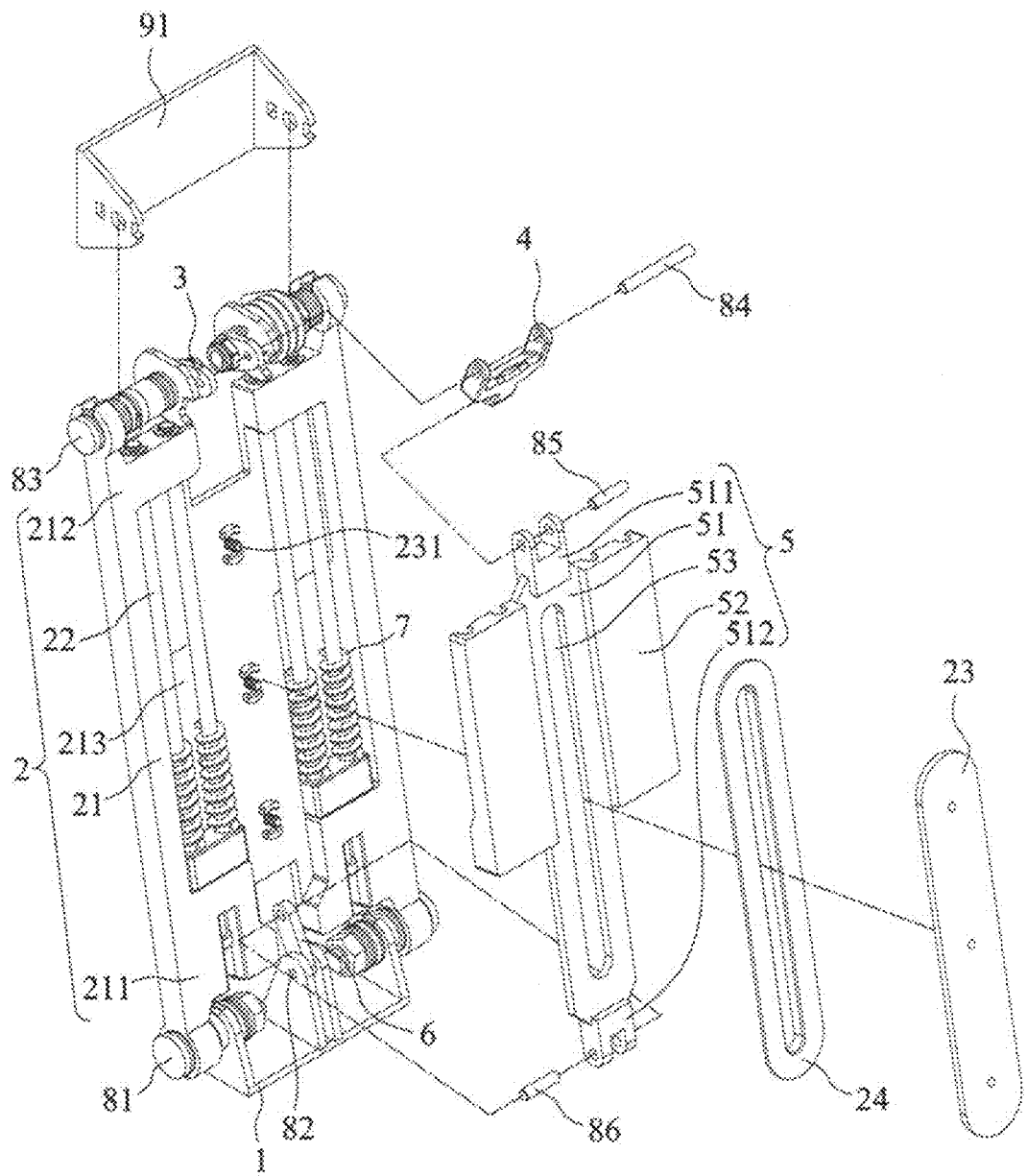
FIG. 2 is a schematic exploded view of a linkage supporting device according to the present invention.

FIG. 2 is a schematic exploded view of a linkage supporting device according to the present invention. The linkage supporting device differs from the conventional four-bar linkage structure in that the linkage supporting device has one bar received in another bar so as to reduce the overall size of the linkage supporting device.

In an embodiment, the linkage supporting device is used to support a display on a working surface (not shown). The linkage supporting device has a base 1, a first bar member 2, two second bar members 3, a third bar member 4, a fourth bar member 5, a fifth bar member 6, two first shafts 81, a second shaft 82, two third shafts 83, a fourth shaft 84, a fifth shaft 85, a sixth shaft 86, four spring members 7, and a display holder 91.

The base 1 can be placed on the working surface. The first shafts 81 are fixed on two sides of the base 1, respectively. The second shaft 82 is fixed in the middle of the base 1. It should be noted that the first shafts 81 do not coincide with the second shaft 82.

The first bar member 2 has a main bar 21, four guiding bars 22, and a cover 23. The main bar 21 and the cover 23 substantially form a case body that defines a receiving space 213. The main bar 21 has a first end 211 pivotally disposed on the first shafts 81, and a second end 212 opposite to the first end 211 and pivotally disposed on the third shafts 83. The four guiding bars 22 are received in the receiving space 213 and substantially extend from the first end 211 toward the second end 212.

Each of the second bar members 3 is of a sheet shape, and has one end pivotally disposed on the corresponding third shaft 83 and the other end pivotally disposed on the fourth shaft 84.

The third bar member 4 is Y-shaped, and has two upper ends pivotally disposed on the fourth shaft 84 and one lower end pivotally disposed on the fifth shaft 85.

The fourth bar member 5 has a sliding bar 51 and two wing plates 52. The sliding bar 51 is slidably received in the receiving space 213 of the first bar member 2. The sliding bar 51 is sandwiched between the main bar 21 of the first bar member 2 and the cover 23, and thus can move upward or downward in the receiving space 213. That is, the sliding bar 51 only slides toward the first end 211 or the second end 212 of the first bar member 2 and does not slide toward left or right side of the receiving space 213. The sliding bar 51 has a head end 511 pivotally disposed on the fifth shaft 85 and a tail end 512 opposite to the head end 511 and pivotally disposed on the sixth shaft 86. Each of the wing plates 52 is correspondingly and slidably disposed on two of the guiding bars 22. In an embodiment, each of the wing plates 52 has grooves (not labeled) formed on a surface thereof for receiving the guiding bars 22. As such, when the sliding bar 51 slides in the receiving space 213, the grooves of the wing plates 52 and the guiding bars 22 facilitate to prevent the sliding bar 51 from deviating from its original plane.

In an embodiment, the grooves are formed on the surfaces of the wing plates 52 facing the guiding bars 22 so as to receive the guiding bars 22. Alternatively, a plurality of through holes can be formed inside the wing plates 52 so as for the guiding bars 22 to penetrate therethrough. Further, the number of the guiding bars 22 and the spring members 7 of the present embodiment is only for illustrative purposes and does not intend to limit present invention.

The fifth bar member 6 is of a plate shape, and has two ends pivotally disposed on the sixth shaft 86 and the second shaft 82, respectively. If the base 1 is viewed as a bar, the base 1, the first shafts 81, the second shaft 82, the first bar member 2, the third shafts 83, the second bar member 3, the fourth shaft 84, the third bar member 4, the fifth shaft 85, the fourth bar member 5, the sixth shaft 86 and the fifth bar member 6 form a six-bar linkage structure.

The spring members 7 are received in the receiving space 213 of the main bar 21. Each of the spring members 7 has one end connected to the first bar member 2 and the other end connected to the wing plate 52 of the fourth bar member 5. In the present embodiment, the spring members 7 are, but not limited to, compression springs for pushing the wing plates 52 toward the first end 211 of the main bar 21.

The display holder 91 is substantially U-shaped and has two ends pivotally disposed on the third shafts 83 for holding a display (not shown).

Further, the cover 23 can be configured to the main bar 21 by a screw group 231 passing through a through groove 53 of the sliding bar 53, which keeps the fourth bar member 5 sliding steadily in the receiving space 213. That is, the fourth bar member 5 can only slide toward the first end 211 or the second end 212 of the main bar 21.

The first bar member 2 has a hollow spacer 24 disposed between the cover 23 and the sliding bar 51 and preventing excessive friction between the sliding bar 51 and the cover 23.

In an embodiment, the first shafts 81, the third shafts 83, the fifth shaft 85 and the sixth shaft 86 are on the same plane, but the second shaft 82 and the fourth shaft 84 are not on the plane. That is, during a sliding process of the sliding bar 51, the first shafts 81, the third shafts 83, the fifth shaft 85 and the sixth shaft 86 remain on the same plane, but the fourth shaft 84 and the sixth shaft 86 rotate around the third shafts 83 and the second shafts 82, respectively. Further, the fifth shaft 85 can be away from or close to the third shafts 83 along the plane, and the sixth shaft 86 can be away from or close to the first shafts 81 along the plane.

Figure 3A:
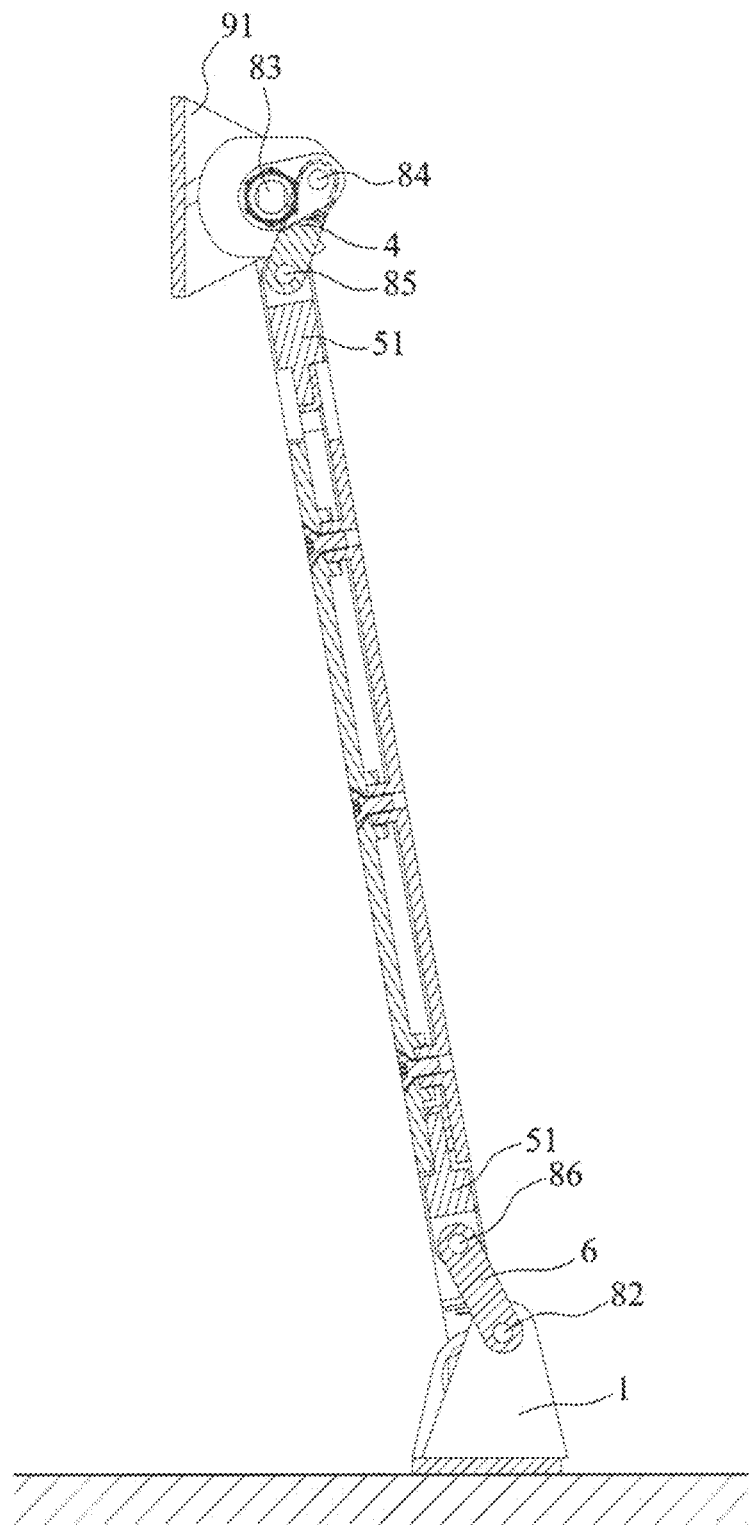
FIGS. 3A and 3B are schematic cross-sectional views showing operation of the linkage supporting device according to the present invention.
Figure 3B:
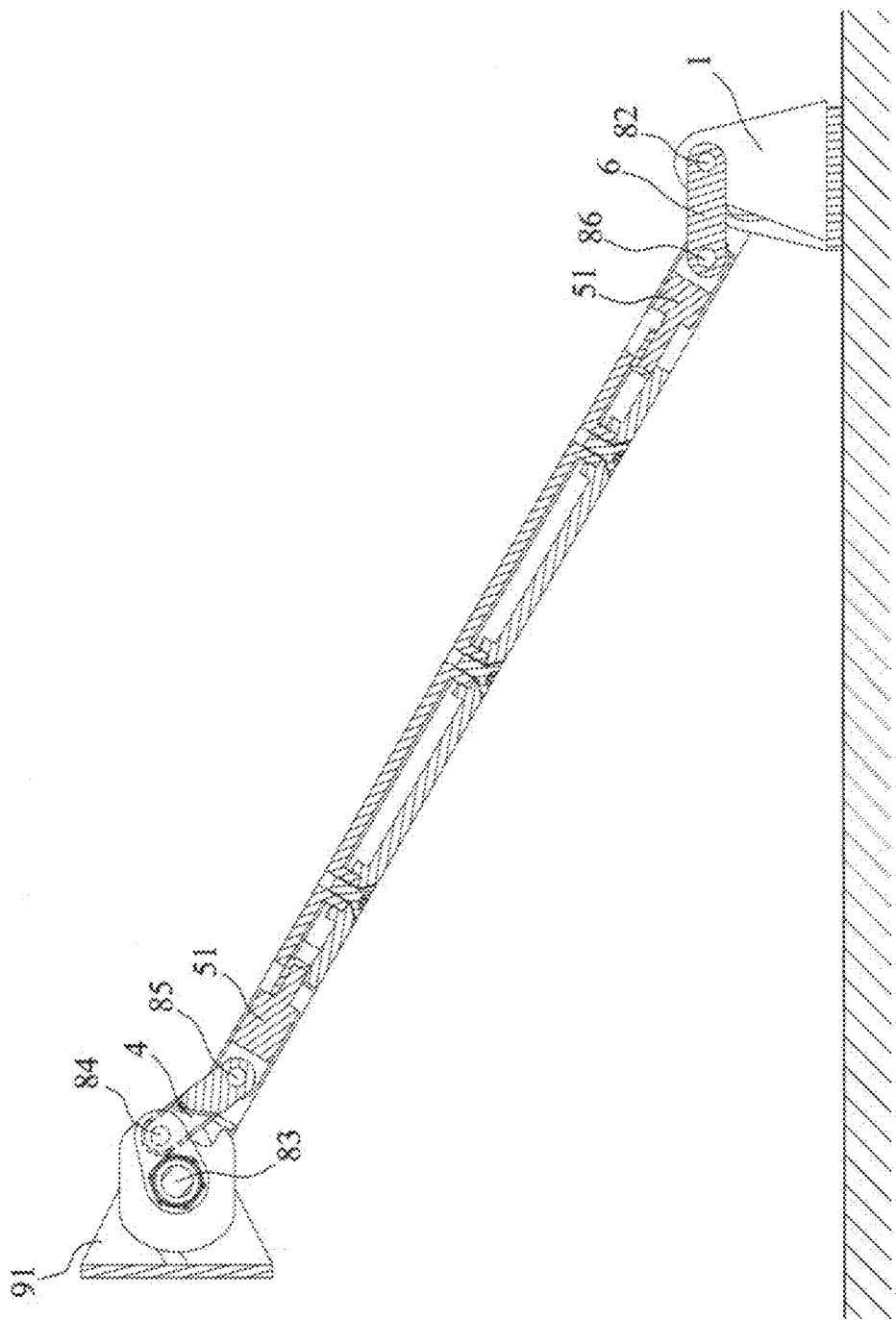
Figure 4A:
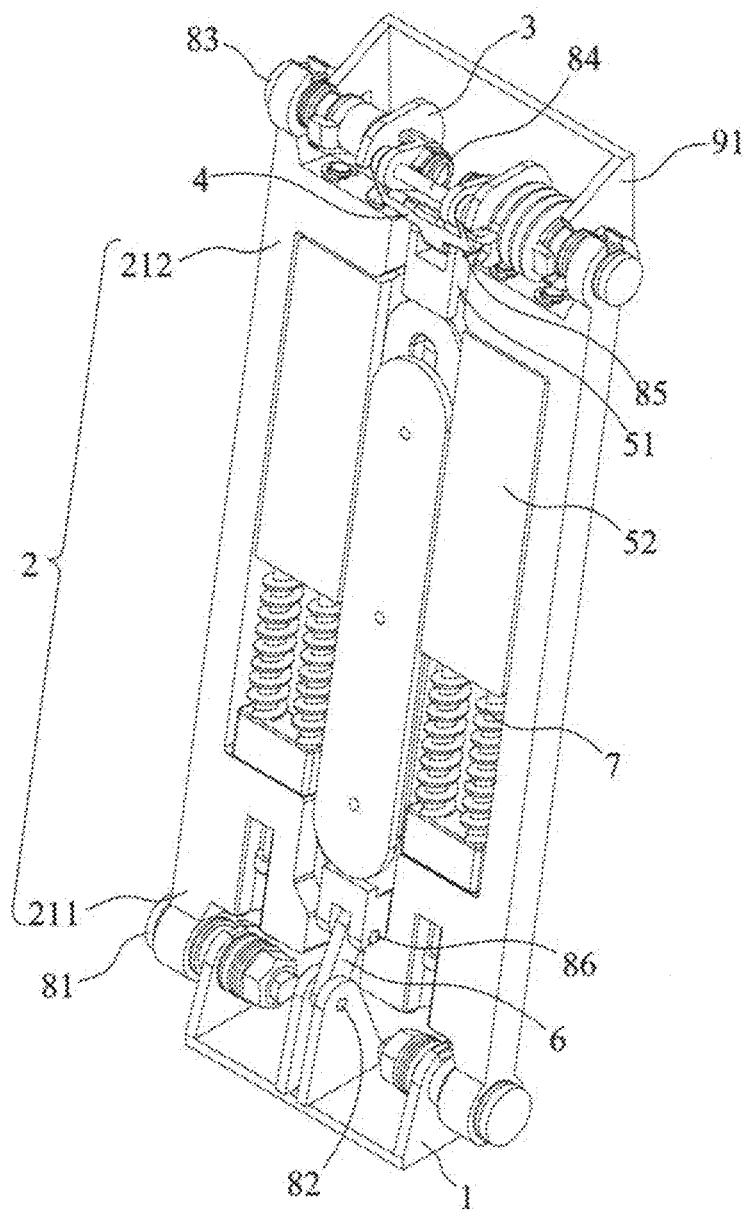
FIGS. 4A and 4B are schematic upper views showing operation of the linkage supporting device according to the present invention.
Figure 4B:
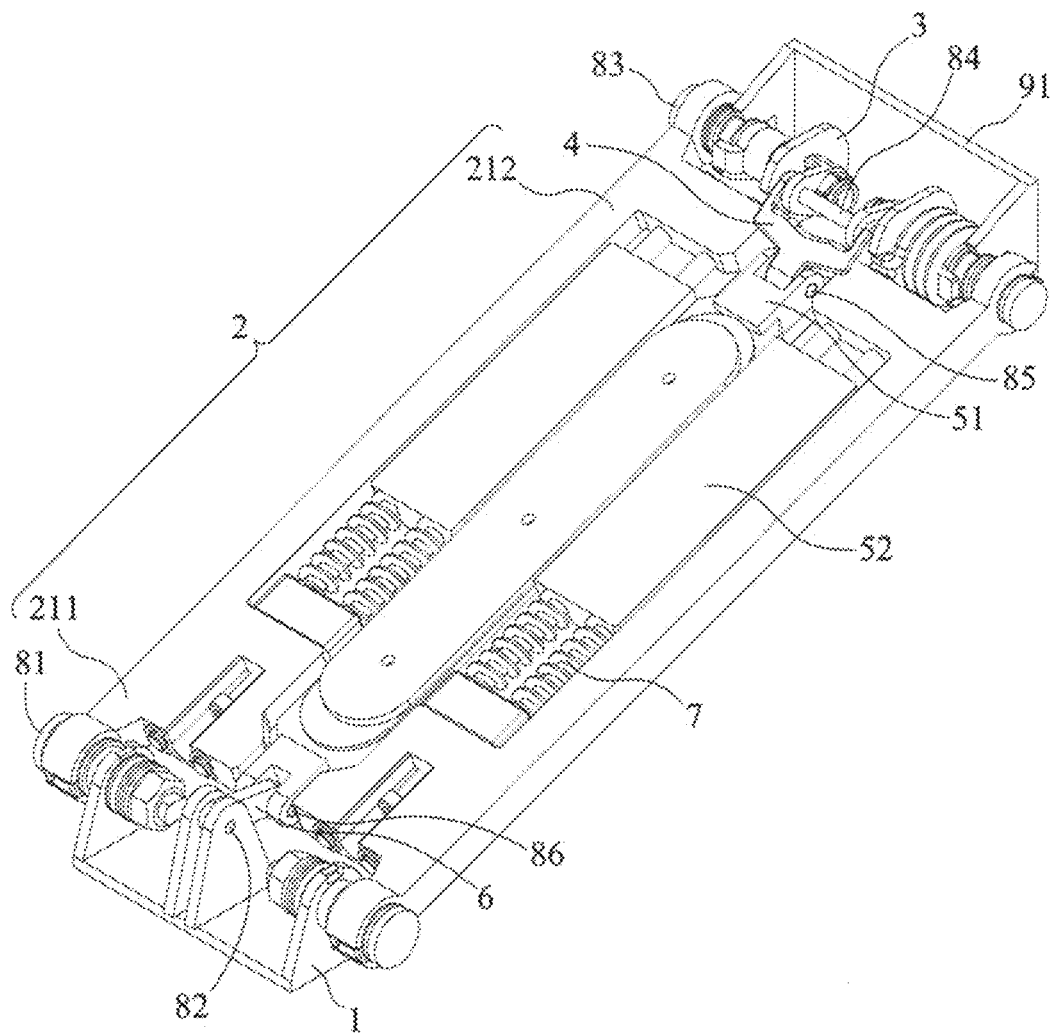

FIGS. 3A to 4B are schematic cross-sectional and upper views showing operation of the linkage supporting device between a highest position and a lowest position. FIGS. 3A and 4A show a state in which the display is at the highest position and FIGS. 3B and 4B show a state in which the display is at the lowest position.

Referring to FIGS. 3A and 4A, when the display is at the highest position, if the working surface where the base 1 is placed is used as a reference surface, the sixth shaft 86 is at a position slightly left above the second shaft 82, the sliding bar 51 is at a position close to the second end 212 of the first bar member 2, and the spring members 7 have one ends connected to the first bar member 2 and the other ends connected to the wing plates 52 and are in a minimum compression state.

When the display is moved from the highest position toward the lowest position by a user, the relative distance between the first shafts 81 and the second shaft 82 does not change, and the display holder 91 is caused to rotate left relative to the main bar 21 while the angle between the display holder 91 and the working surface is substantially unchanged. During the process, since the first shafts 81 do not coincide with the second shaft 82, the distance from the second shaft 82 to the plane of the first shafts 81, the third shafts 83, the fifth shaft 85 and the sixth shaft 86 gradually increases. As such, the fifth bar member 6 connected to the second shaft 82 draws the sliding bar 51 along with the fifth shaft 85 toward the first shafts 81, i.e., the first end 211 of the main bar 21, so as to cause the fourth shaft 84 to rotate around the third shafts 83, thereby shortening the distance between the fourth shaft 84 and the second shaft 82.

The above-described operation is performed until the display reaches the lowest position. Referring to FIGS. 3B and 4B, the sixth shaft 86 is at the left side of the second shaft 82 (as shown in FIG. 3B), the sliding bar 51 is at a position close to the first end 211 of the first bar member 2, and the spring members 7 are compressed to a maximum compression state due to downward movement of the sliding bar 51 and the wing plates 52, thereby providing a greater moment compensation.

Since the sliding bar 51 slides in the receiving space 213 of the first bar member 2, the linkage supporting device according to the present invention dispenses with a parallelogram configuration as in the prior art, thereby reducing the size of the overall structure.

Further, the spring members 7 can be designed according to practical requirements. For example, the spring members 7 can be tension springs and do not need to be disposed around the guiding bars 22. If the spring members 7 are tension springs, when the display is moved from the highest position to the lowest position, the fourth shaft 84 rotates around the third shafts 83 and the distance between the fourth shaft 84 and the second shaft 82 is increased. As such, the third bar member 4 is drawn to cause the sliding bar 51 to slide toward the second end 212 of the main bar 21, thereby stretching the spring members 7.

Figure 5:
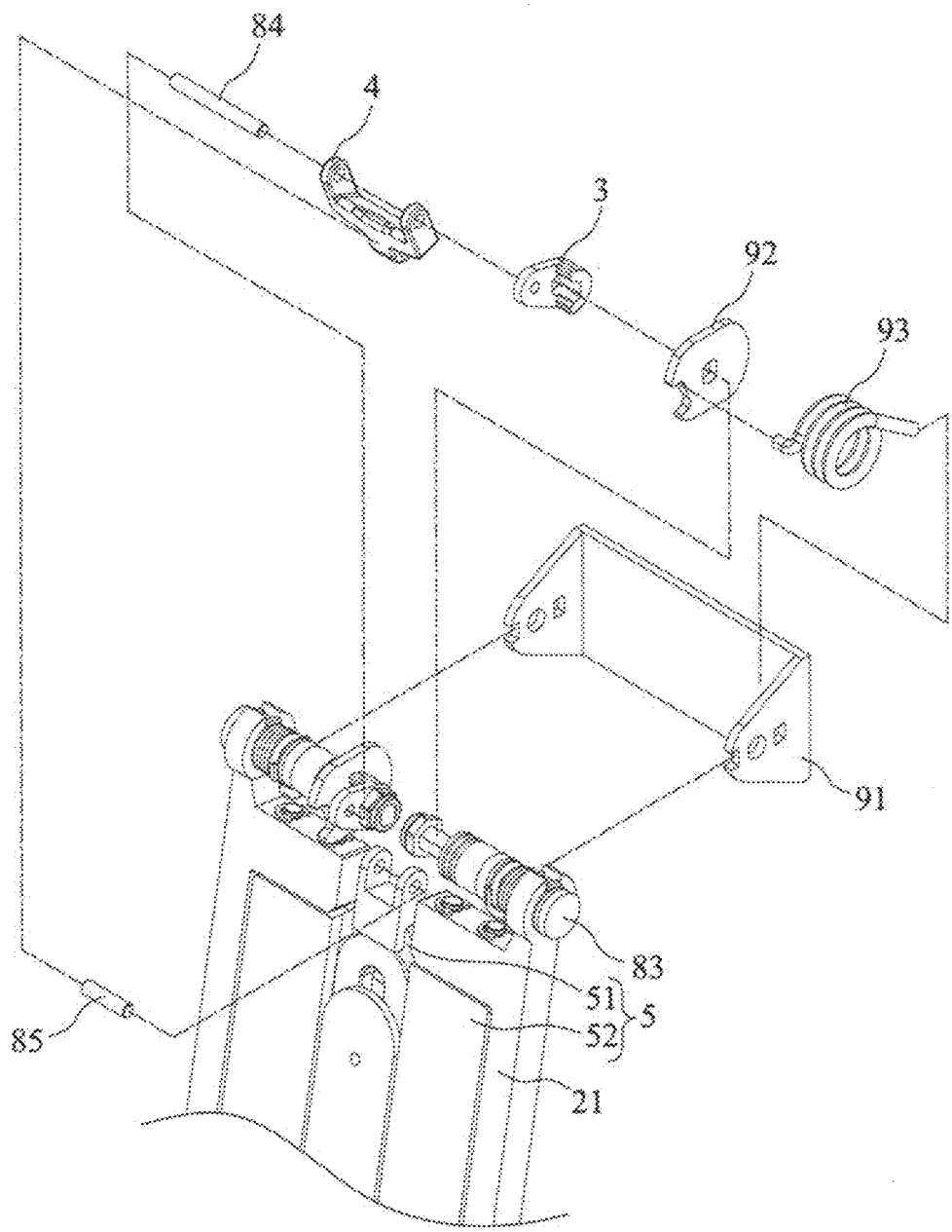
FIG. 5 is a partially exploded view of the linkage supporting device according to the present invention.

FIG. 5 is a partially exploded view of the linkage supporting device according to the present invention, which illustrates the relationship between the second bar member 3, the third bar member 4 and the third shafts 83, the fourth shaft 84 and the fifth shaft 85. Referring to FIG. 5, each of the third shafts 83 has a non-circular cross section. When the display holder 91 rotates relative to the main bar 21, the third shafts 83 are caused to rotate around their axes so as to cause the second bar member 3 pivotally disposed on the third shafts 83 to rotate, thereby causing the fourth shaft 84 to rotate around the third shafts 83 and consequently causing the sliding bar 51 and the wing plates 52 of the fourth bar member 5 pivotally disposed on the third bar member 4 through the fifth shaft 85 to slide.

Further, two torsion springs 93 are disposed on the third shafts 83. Each of the torsion springs 93 has one end engaged with the display holder 91 and the other end engaged with a spacer 92 that is pivotally disposed on the third shaft 83. Therefore, when the display holder 91 rotates, the torsion springs 93 can be compressed to generate a restoring force to counterbalance the weight of the display holder 91.

Figure 6:
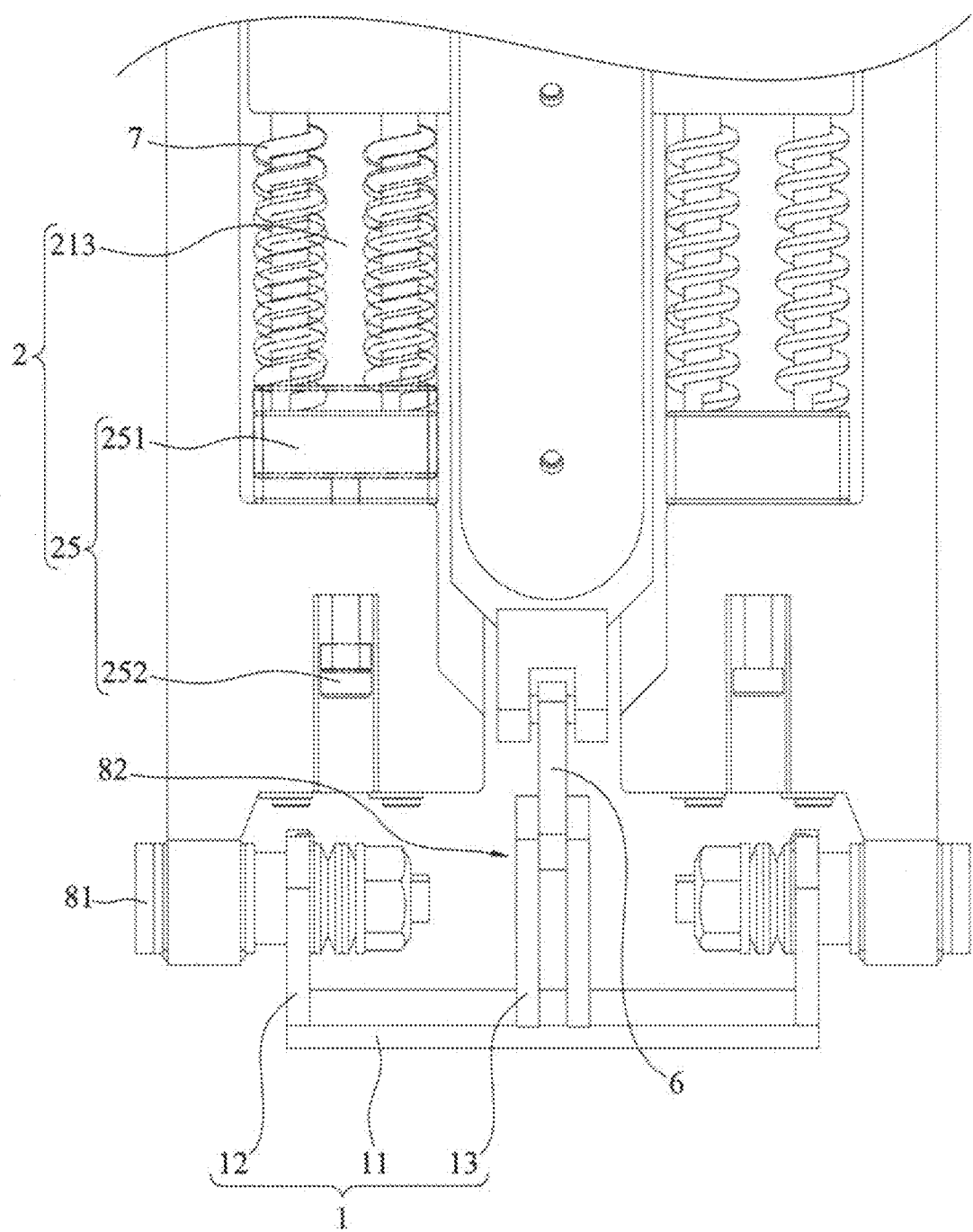
FIG. 6 is a schematic view of a torque adjusting unit of the linkage supporting device according to the present invention.

FIG. 6 is a schematic view of a torque adjusting unit of the linkage supporting device according to the present invention. The first bar member 2 has a torque adjusting unit 25 for adjusting the position of sliding blocks 251 in the receiving space 213. The spring members 7 have one ends abutting against the sliding blocks 251. The torque adjusting unit 25 adjusts the position of the sliding blocks 251 through adjusting members 252. The adjusting members 252 can be screws. By rotating the adjusting members 252, the sliding blocks 251 are moved close to or away from the second end 212 of the main bar 21, thereby adjusting forces of the spring members 7.

Therefore, the linkage supporting device according to the present embodiment can adjust the forces of the spring members 7 through the torque adjusting unit 25. As such, the spring members 7 are tightened or loosened to provide a balance of support for the display at higher and lower positions.

The base 1 has a base body 11 that can be placed on the working surface and outer and inner plates 12, 13 perpendicularly extending from the base body 11. The first shafts 81 penetrate the first bar member 2 and are fixed on the outer plates 12, respectively. The second shaft 82 penetrates the fifth bar member 6 and is fixed on the inner plates 13.

According to the linkage supporting device according to the present invention, one bar member is slidably received in a receiving space of another bar member such that when the position of the display is changed, sliding of the bar member in the receiving space causes a cooperative operation of the bar members of the linkage supporting device so as to support the display at different positions. Compared with the conventional four-bar linkage supporting structure having a parallelogram configuration, the linkage supporting device according to the present invention allows one bar member to be received in the receiving space of another bar member so as to reduce the overall size.

The above-described descriptions of the detailed embodiments are only to illustrate the preferred implementation according to the present invention, and it is not to limit the scope of the present invention. Accordingly, all modifications and variations completed by those with ordinary skill in the art should fall within the scope of present invention defined by the appended claims.

What is claimed is:

1. A linkage supporting device for supporting a display on a working surface, comprising:
   a base that can be placed on the working surface;
   a first shaft fixed to the base;
   a second shaft fixed to the base without coinciding with the first shaft;
   a first bar member having a main bar having a first end, a second end and a receiving space, the first end pivotally disposed on the first shaft;
   a third shaft for the second end of the main bar to be pivotally disposed thereon;
   a second bar member having one end pivotally disposed on the third shaft;
   a fourth shaft for the other end of the second bar member to be pivotally disposed thereon;

a third bar member having one end pivotally disposed on the fourth shaft;

a fifth shaft for the other end of the third bar member to be pivotally disposed thereon;

a fourth bar member that has a sliding bar slidably received in the receiving space of the main bar and having a head end pivotally disposed on the fifth shaft;

a sixth shaft for a tail end of the sliding bar to be pivotally disposed thereon;

a fifth bar member having two ends pivotally disposed on the sixth shaft and the second shaft, respectively; and a spring member received in the receiving space of the main bar and having two ends connected to the first bar member and the fourth bar member, respectively;

wherein when the display is moved from a higher position to a lower position, the fourth shaft rotates around the third shaft and the second bar member pivotally drives the third bar member to move, so as to cause the sliding bar to slide in the receiving space, thereby increasing a resistance force of the spring member.

2. The linkage supporting device of claim 1, wherein the spring member is a compression spring, and wherein when the display is moved from the higher position to the lower position, the fourth shaft rotates around the third shaft to shorten a distance between the fourth shaft and the second shaft and cause the third bar member to move so as to cause the sliding bar to slide toward the first end of the main bar, thereby compressing the spring member.

3. The linkage supporting device of claim 1, wherein the first shaft, the third shaft, the fifth shaft and the sixth shaft are on a same plane, and the second shaft and the fourth shaft are not on the plane.

4. The linkage supporting device of claim 1, wherein the base has a base body disposed on the working surface, and an inner plate and an outer plate perpendicularly extending from the base body, the first shaft is fixed on the outer plate, and the second shaft is fixed on the inner plate.

5. The linkage supporting device of claim 1, wherein the first bar member further has a torque adjusting unit that adjusts a position of a sliding block in the receiving space, and one end of the spring member abuts against the sliding block.

6. The linkage supporting device of claim 5, wherein the first bar member further has a guiding bar disposed on the main bar, the fourth bar member further has a wing plate covering the guiding bar, and the other end of the spring member abuts against the wing plate.

7. The linkage supporting device of claim 6, wherein the spring member is disposed around the guiding bar.

8. The linkage supporting device of claim 1, wherein the first bar member further has a cover configured to the main bar through a screw group passing through a through groove of the sliding bar.

9. The linkage supporting device of claim 1, further comprising a display holder pivotally disposed on the third shaft for holding the display.

* * * * *